Aug. 20, 1963 O. V. PAYNE 3,101,098

WEFT REPLENISHING LOOM

Filed Feb. 6, 1961 9 Sheets-Sheet 1

INVENTOR
OSCAR V. PAYNE

Chas. T. Hawley
ATTORNEY

INVENTOR
OSCAR V. PAYNE
Chas. T. Hawley
ATTORNEY

WEFT REPLENISHING LOOM

Filed Feb. 6, 1961 9 Sheets-Sheet 3

INVENTOR
OSCAR V. PAYNE
Chas. T. Hawley
ATTORNEY

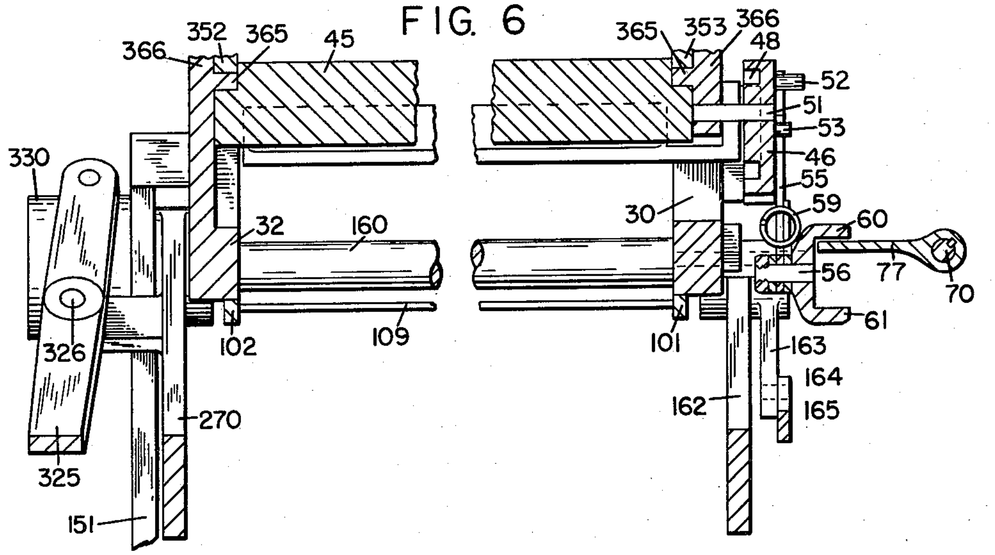
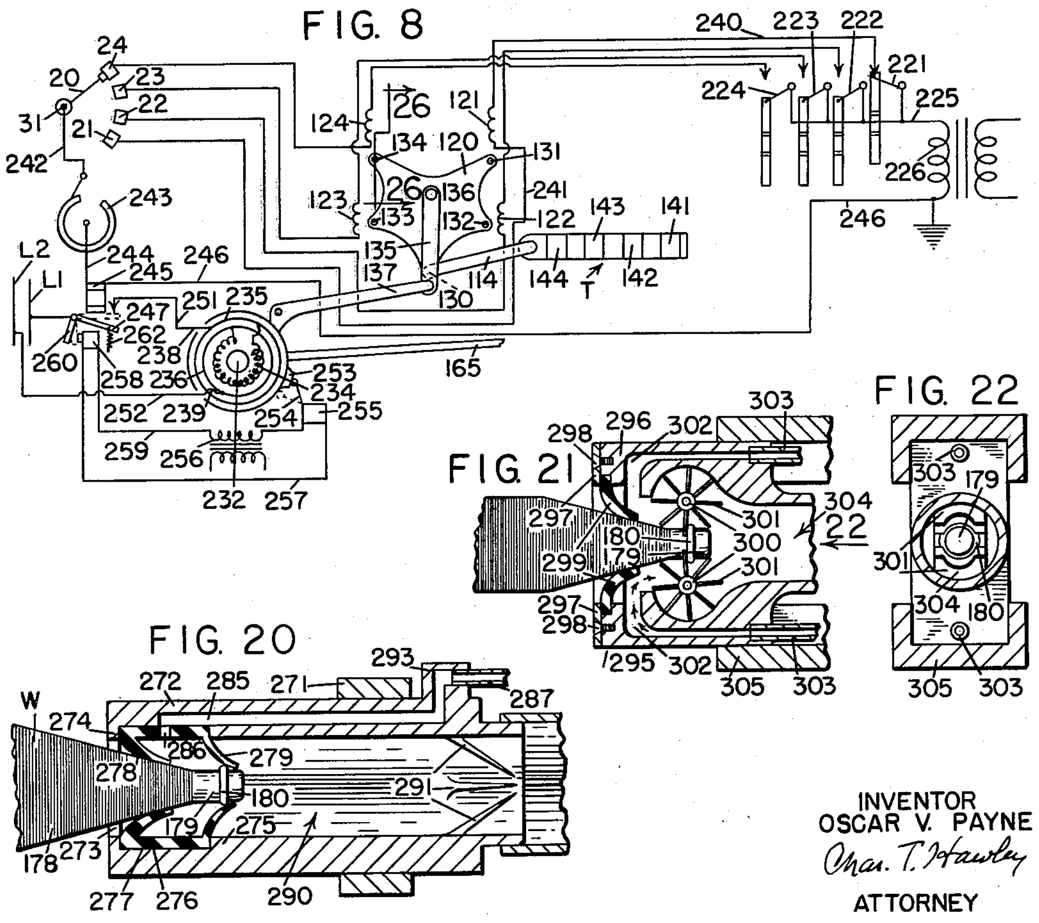
FIG. 8, FIG. 20, FIG. 21, FIG. 22
INVENTOR
OSCAR V. PAYNE
Chas. T. Hawley
ATTORNEY Aug. 20, 1963 O. V. PAYNE 3,101,098

WEFT REPLENISHING LOOM

Filed Feb. 6, 1961 9 Sheets-Sheet 5

INVENTOR
OSCAR V. PAYNE
Chas. T. Hawley
ATTORNEY

INVENTOR
OSCAR V. PAYNE
Chas. T. Hawley
ATTORNEY

Aug. 20, 1963 O. V. PAYNE 3,101,098

WEFT REPLENISHING LOOM

Filed Feb. 6, 1961 9 Sheets-Sheet 7

INVENTOR
OSCAR V. PAYNE
Chas. T. Hawley
ATTORNEY

Aug. 20, 1963 O. V. PAYNE 3,101,098

WEFT REPLENISHING LOOM

Filed Feb. 6, 1961 9 Sheets-Sheet 8

INVENTOR
OSCAR V. PAYNE
Chas. T. Hawley
ATTORNEY

Aug. 20, 1963 O. V. PAYNE 3,101,098

WEFT REPLENISHING LOOM

Filed Feb. 6, 1961 9 Sheets-Sheet 9

INVENTOR
OSCAR V. PAYNE
Chas. T. Hawley
ATTORNEY

3,101,098
WEFT REPLENISHING LOOM

Oscar V. Payne, Greenfield, N.H., assignor to Crompton & Knowles Corporation, Worcester, Mass., a corporation of Massachusetts Filed Feb. 6, 1961, Ser. No. 87,237
27 Claims. (Cl. 139—232)

Figures 1, 15, 16, 17, 18:
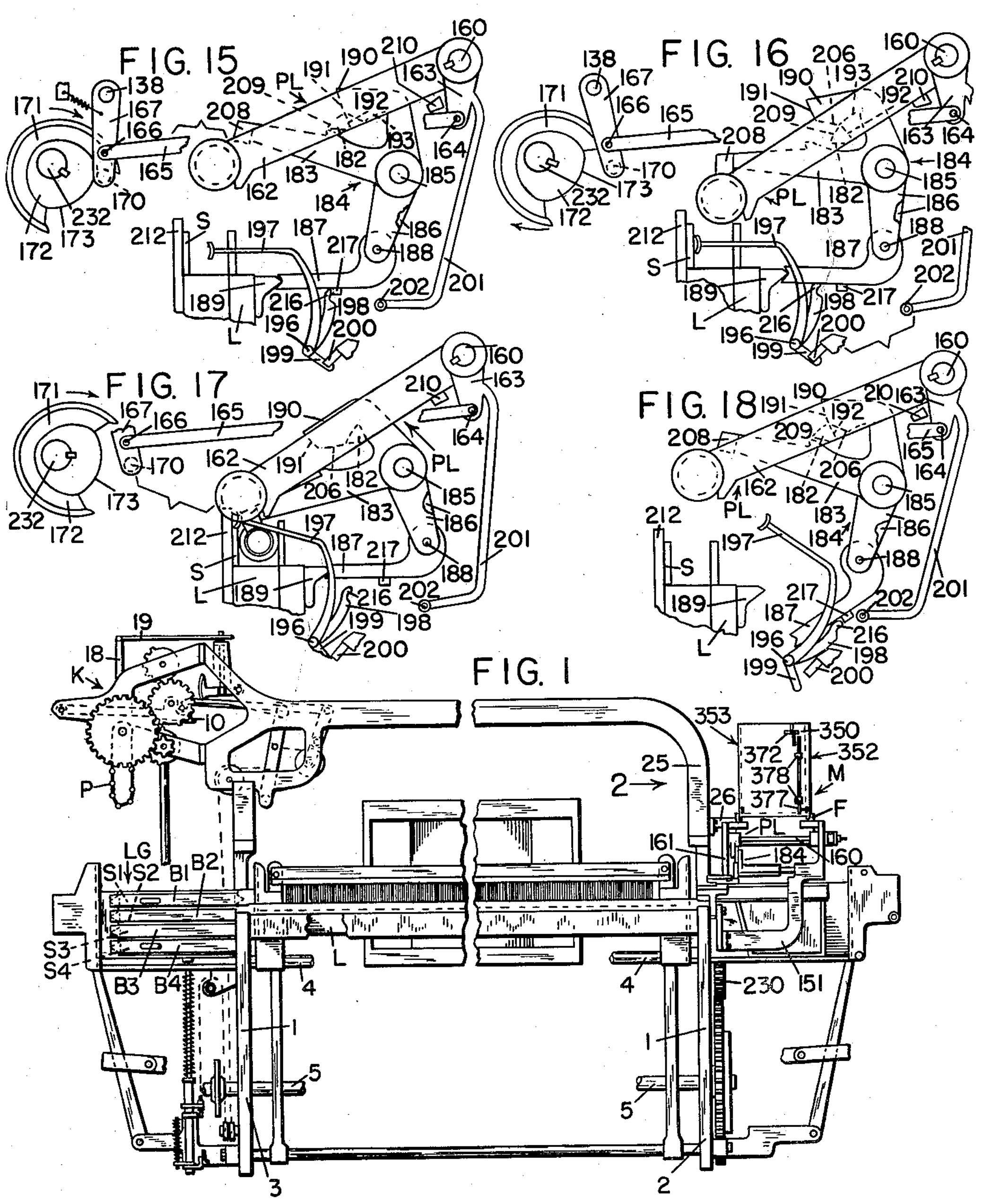

This invention relates to weft replenishing looms, and it is the general object of the invention to provide replaceable reserve bobbin magazines in a loom which operates with two or more shuttles to lay wefts of different characteristics.

Heretofore it has been proposed to equip a loom adapted to weave weft of one color only with a removable bobbin magazine which is filled with bobbins in the winding room and is then taken to the weave room and applied to the loom. When the magazine is depleted of bobbins it is removed from the loom and replaced with another similar magazine. So far as is known this principle has not been used on multi-shuttle looms weaving wefts of different characteristics, such as color, size, material, or other feature.

The reason for using replaceable magazines is to reduce the labor of bobbin boys incident to keeping looms supplied with reserve bobbins. It is the general purpose of this invention to provide removable magazines for a loom weaving more than one kind of weft.

It is another object of the invention to provide the loom with discharge openings for different types of weft in the magazine and provide means for registering the various stacks or groups of bobbins with their respective discharge openings.

It is another object of the invention to increase the reserve bobbin capacity of a loom by providing a pair of stacks of bobbins for each character of weft and feed bobbins alternately from the stacks by means of cradles, the loom and magazines having cooperating means for holding the latter in position so that the stacks register with the cradles.

It is a further object of the invention to provide weft replenishing mechanism including an intermediate stationary frame, removable magazine means above and registered with the framework, and a horizontally movable multi-pocket tray below the framework shiftable to move a bobbin which was derived from a magazine and passed through the framework toward a transfer position.

It is another object of the invention to provide simple means for moving the tray either forwardly or rearwardly from a normal position by a multi-pivot but normally unpivoted lever associated with selective means to determine which of the pivots shall be active.

Reserve bobbins used with replenishing mechanism as contemplated herein usually have small weft bunches wound on their tips. The bunches are removed incident to bobbin transfer and held during the pick of the shuttle following transfer to effect self-threading of the shuttle. It is another object of this invention to provide a bunch remover including a hollow member or head which is slipped over the tip of the bobbin in order to direct compressed air against the bunch and remove it from the bobbin tip. A flexible conical element made for instance of soft rubber is blown against the conically wound part of the weft of the bobbin to prevent unravelling of the thread from the bobbin. Other forms of removers to be described hereinafter include turbine or paddle wheels air driven to push the bunch of the bobbin tip, and a reciprocating piston, all to be set forth in more detail as the description proceeds.

Figures 2, 3, 4:
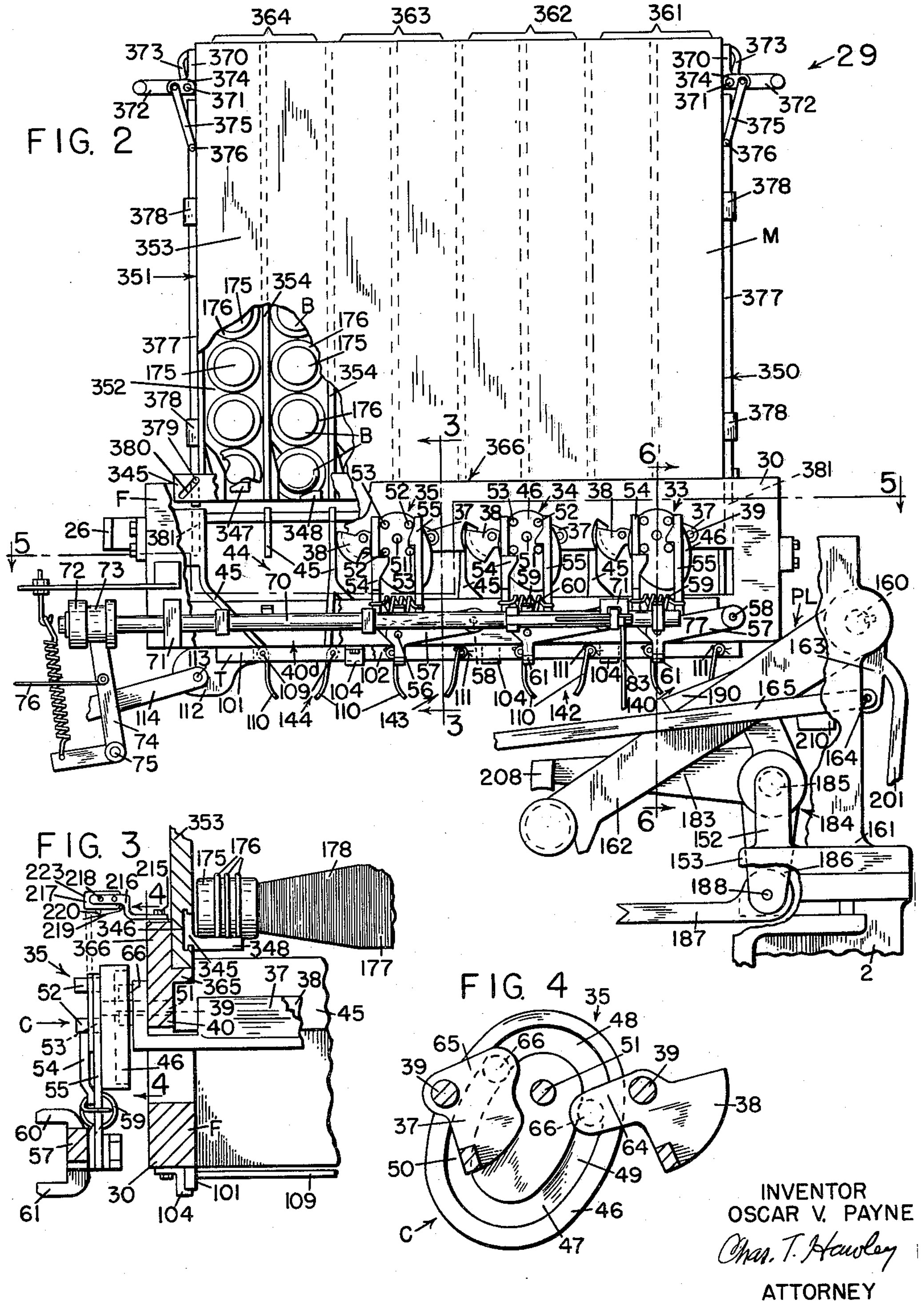
Figures 5, 9, 10:
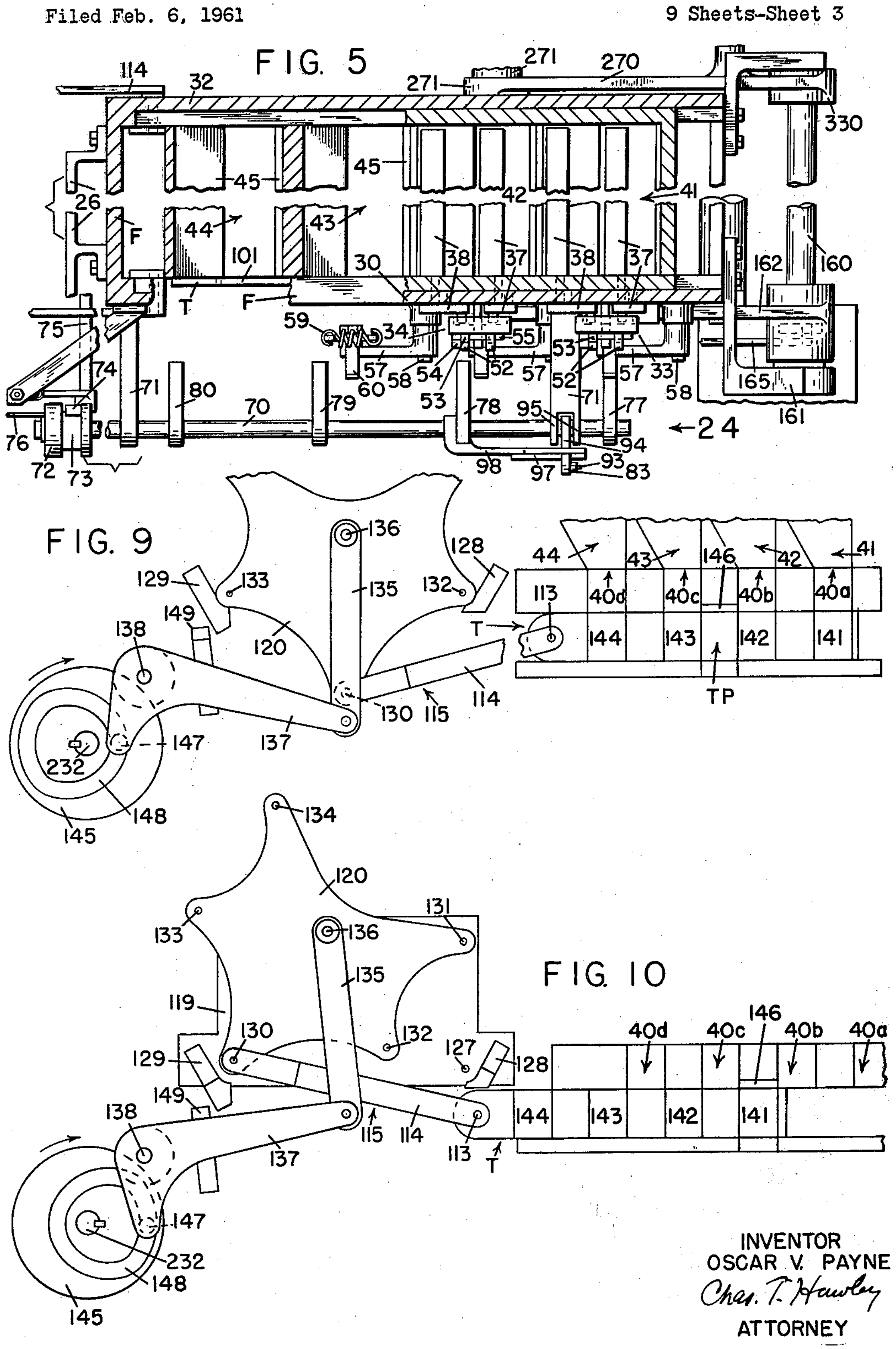
Figures 7, 13, 14:
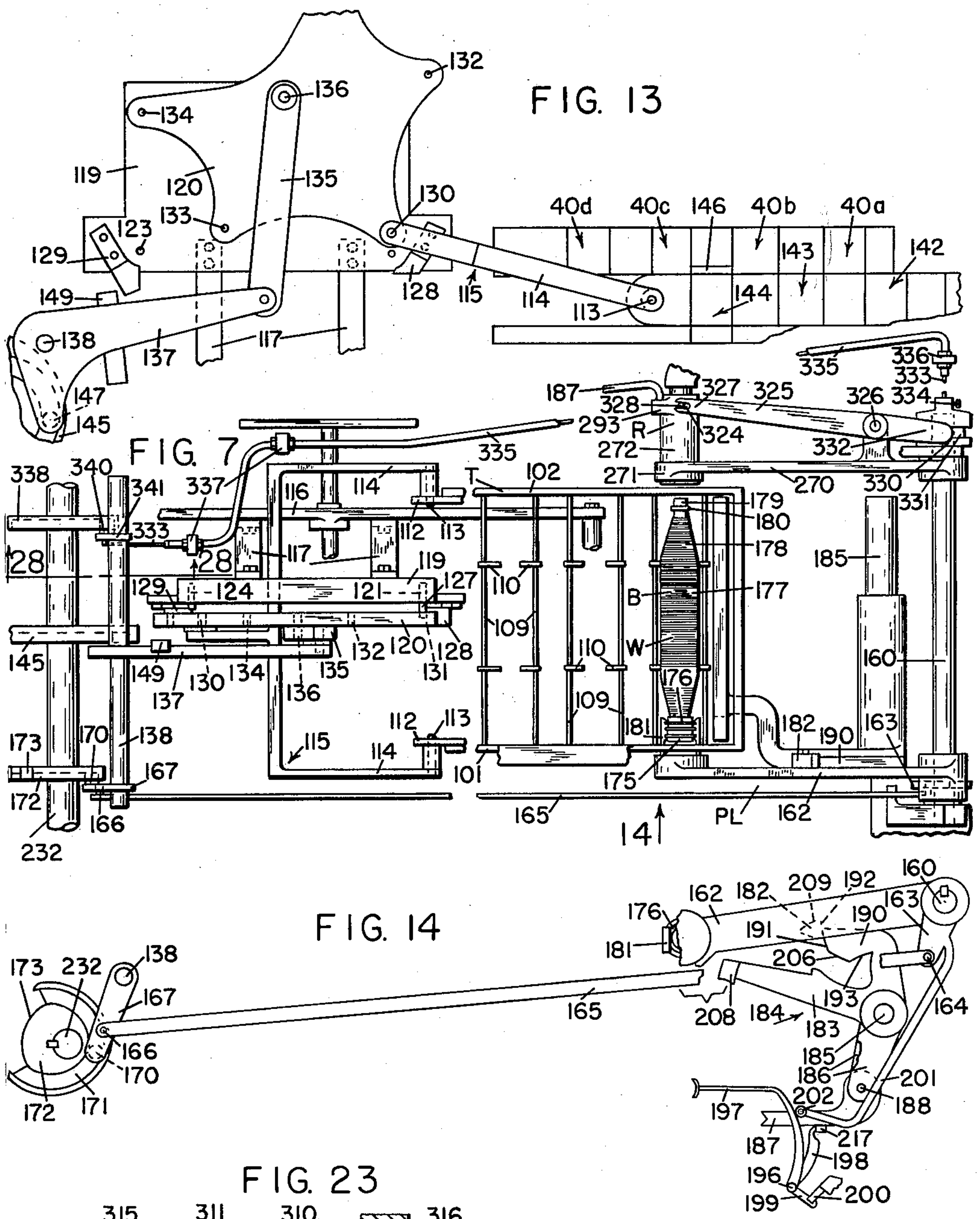
Figure 23:
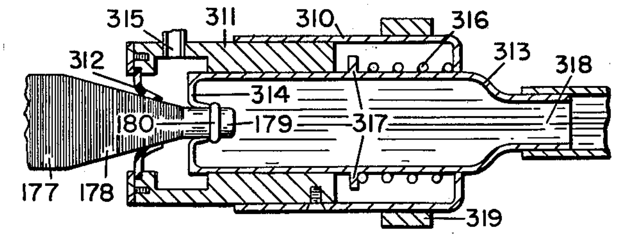
Figures 11, 12, 19:
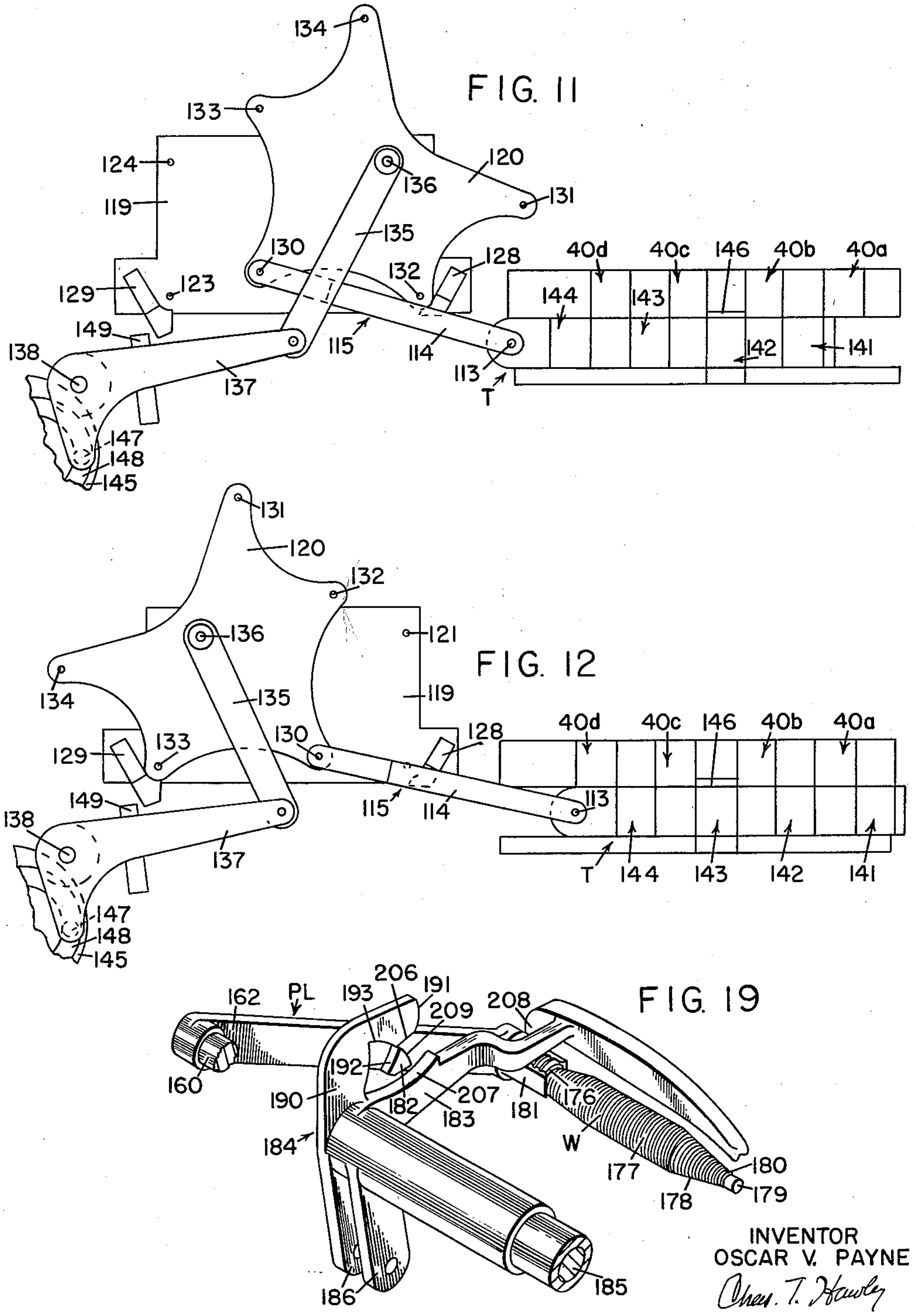
Figure 29:
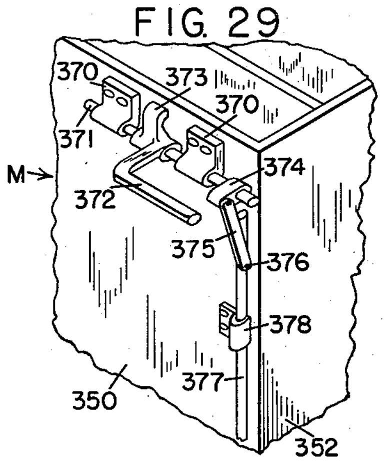
Figure 28:
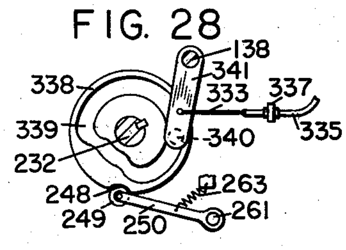
Figure 27:
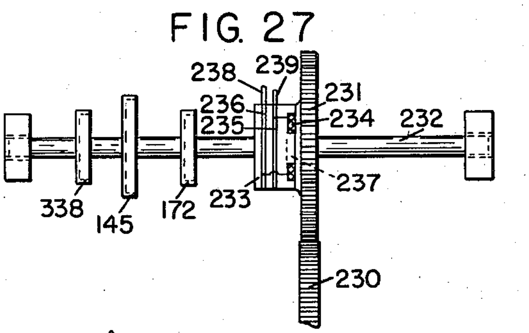
Figure 30:
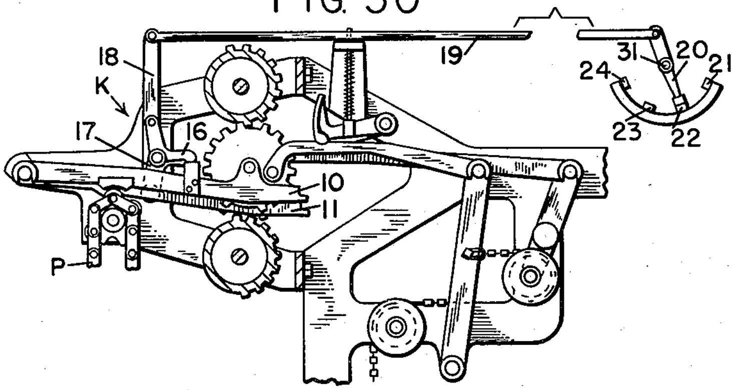
Figure 31:
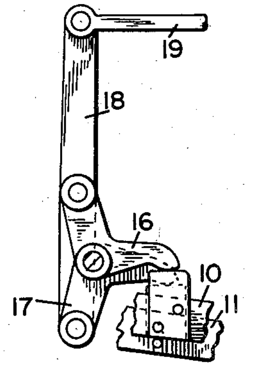
Figure 24:
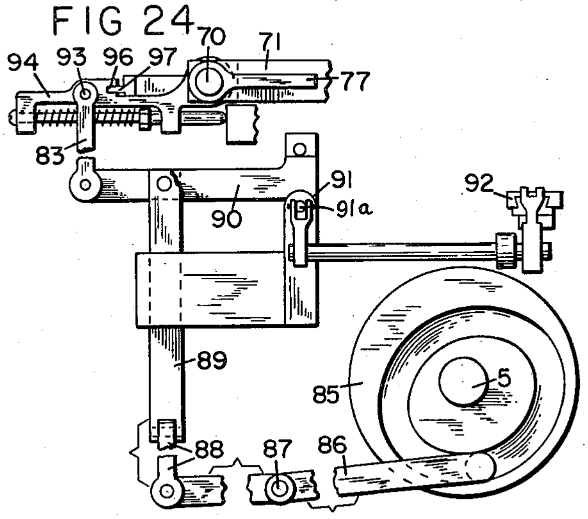
Figure 26:
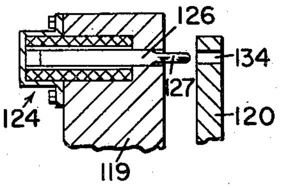
Figure 25:
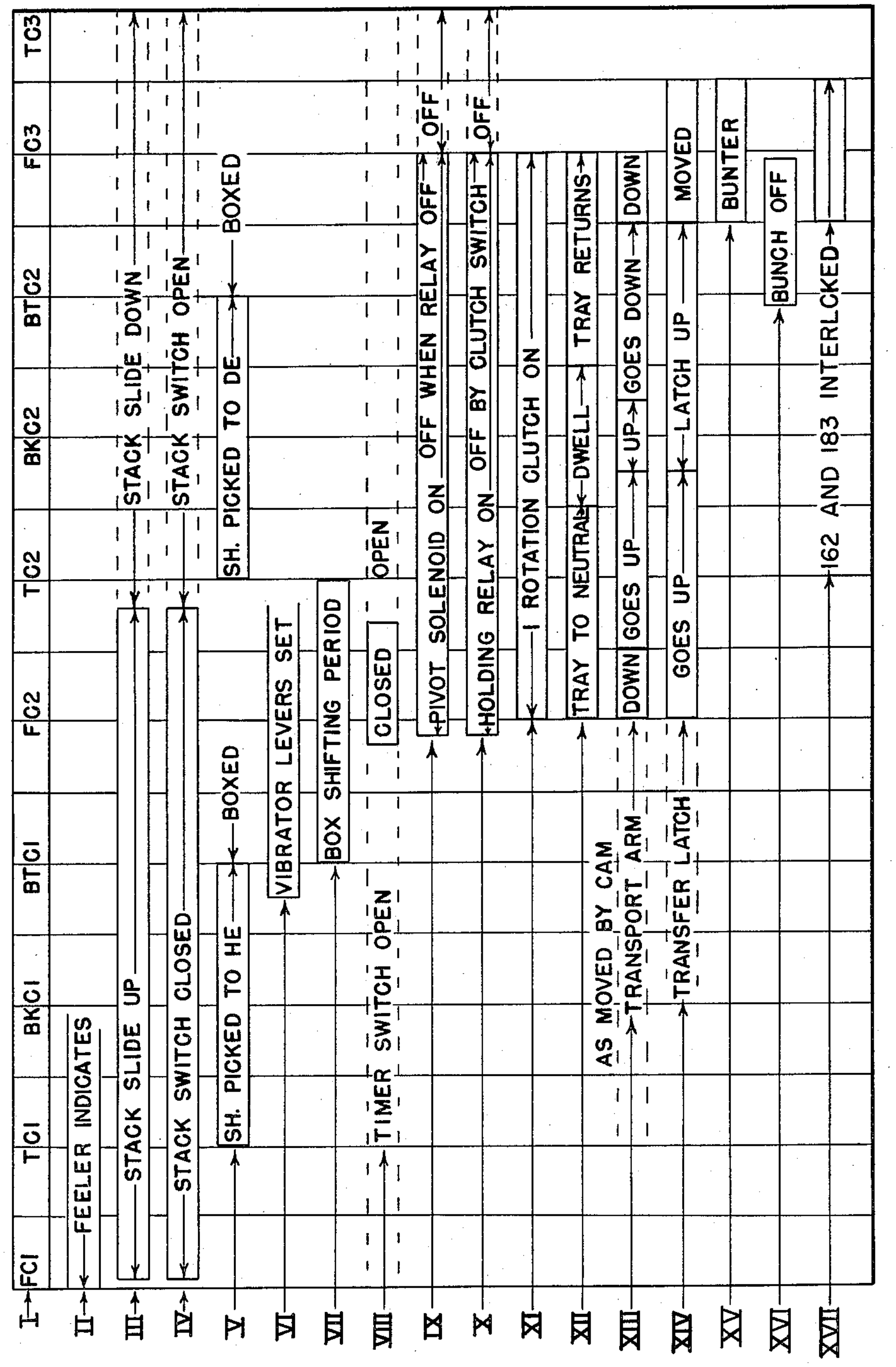
Figure 35:
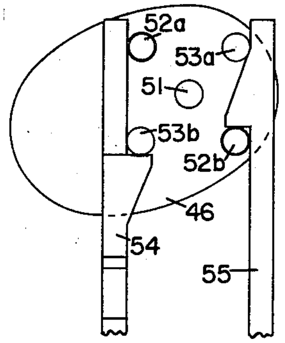
Figure 36:
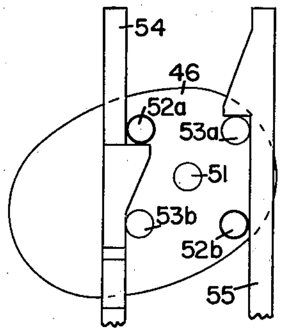
Figure 37:
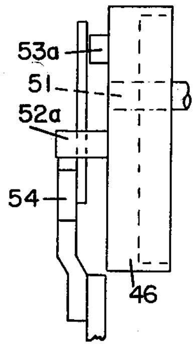

In order that the invention may be clearly understood reference is made to the accompanying drawings which illustrate by way of example three embodiments of the invention and in which:

FIG. 1 is a front elevation of a loom having the invention applied thereto,

FIG. 2 is an enlarged side elevation looking in the direction of arrow 2, FIG. 1, showing the weft replenishing magazine and associated parts, FIG. 3 is an enlarged section on line 3—3, FIG. 2, parts being broken away, FIG. 4 is a detail section on line 4—4, FIG. 3, showing a cam for rocking two bobbin cradles, FIG. 5 is a horizontal section on line 5—5, FIG. 2, FIG. 6 is an enlarged section on line 6—6, FIG. 2, FIG. 7 is a plan of the bobbin tray, the parts above it being omitted, showing also the bobbin transporting lever, FIG. 8 is a diagrammatic view showing the electric circuits and the parts they control, the extreme left-hand upper part showing part of the head of the loom and the remainder of the figure showing parts at the opposite or magazine end, FIG. 9 is a diagrammatic view showing the bobbin tray and associated parts in normal position with the tray pockets aligned vertically with their respective cradle compartments above, FIGS. 10–13 are diagrammatic views showing the bobbin tray in four different positions, FIG. 14 is a side elevation of the bobbin transporting lever and associated parts looking in the direction of arrow 14, FIG. 7, FIGS. 15–18 show parts of FIG. 14 in different positions, FIG. 19 is a perspective view showing the relation of the bobbin transporting lever and transferrer arm, FIG. 20 is a longitudinal section through the preferred form of bunch remover shown in FIG. 7, FIG. 21 is a view similar to FIG. 20 but showing a modified form of bunch remover, FIG. 22 is an end view looking into the remover of FIG. 21 in the direction of arrow 22, FIG. 23 is similar to FIG. 20 but of a second modified form, FIG. 24 is a detail view looking in the direction of arrow 24, FIG. 5, showing the feeler controlled mechanism for rocking the color slide, FIG. 25 is a time diagram showing the cyclic relation of the various parts and operations of the invention, FIG. 26 is an enlarged vertical section on line 26—26, FIG. 8, showing one of the solenoids, its core and associated parts, FIG. 27 is a detail elevation looking forwardly from the left of FIG. 7, showing the driving means for three one-rotation cams, FIG. 28 is a vertical section of the bunch remover cam and follower on line 28—28, FIG. 7, FIG. 29 is a perspective of a corner of the magazine looking in the direction of arrow 29 showing the handle and locking rod, FIG. 30 is a vertical section of part of a Knowles head showing the color indicating mechanism, FIG. 31 is an enlarged front elevation of the compound levers shown in FIG. 30, FIGS. 32 to 36 are diagrammatic views illustrating the operation of the mechanisms for turning the cradle rocking cams, and FIG. 37 is a detail diagrammatic view showing the relation between the long and short lugs on a cam and their operating pawls, being similar to the right-hand part of FIG. 6 but showing pawl 54.

Many of the parts of the loom used with this invention are the same as those found on the usual Crompton & Knowles automatic fancy weft replenishing loom. The loom, see FIG. 1, has a frame 1 with right and left-hand loomsides 2 and 3, and has a lay L which moves as usual through front, top, back and bottom center positions and returns to front center each beat or pick of the loom. The lay has a gang of shuttle boxes LG at its left end controlled by a pattern chain P, FIGS. 1 and 30, forming part of a Knowles head mechanism K. The top and bottom shafts 4 and 5 of the loom operate as usual, as do the warp letoff, the weft picking, and cloth takeup mechanism, etc. (not shown). Gang LG has four shuttle box cells B1, B2, B3 and B4, reading down, for four shuttles S1, S2, S3 and S4.

That part of head K which controls the shuttle box gang LG includes two vibrator levers 10 and 11, see FIG. 30, which are independently movable to high or low position by reason of chain P, whereby these levers have four different relative positions, one for each of the shuttle box cells B1–B4. The levers 10 and 11 act on small indicator levers 16 and 17, see FIG. 31, pivoted on the mechanism K and on which floats a lever 18 pivoted to them and connected by link 19 to an electric switch arm 20. The latter is swingable about a center 31 fixed to the loom to engage contacts 21–24, corresponding respectively to box cells B1–B4. The part of arm 20 between contacts 21–24 and center 31 is electric conducting and is capable, depending on its position, of closing four different circuits, one at a time, one for each box cell B1–B4. The levers 10 and 11, and 16 and 17 cooperate somewhat in the manner set forth in Ryon Patent No. 1,663,957.

The Knowles head operates in the usual way and may be driven from either the top or bottom shaft on a one-pick cycle, the chain being built to enable the gang LG to shift at two-pick intervals if required to do so by the pattern. The invention set forth herein is not limited in its use to the Knowles head, which is shown by way of example. It will be sufficient if the loom has means to determine in advance of actual gang shift what that shift will be, that is, which shuttle will be picked next.

*Weft Replenishing Features*

At the opposite end of the loom, the right-hand side as viewed from the front and in FIG. 1, there is located a weft replenishing mechanism which in the present instance supplies wefts of four distinctive types, such as color, size, character, etc. This mechanism includes a fixed structure F which supports bobbin cradles and means to rock them to deliver bobbins, a removable reserve bobbin holder M over the fixed structure, and a horizontally shiftable bobbin tray T under it, see FIG. 2. In addition, there is a bobbin placer PL, FIG. 2, to take a bobbin from the tray and move it positively to a position for cooperation with the transferrer arm, and there is also a bunch remover which comes into action at the time of bobbin transfer.

*Stationary Structure F*

The fixed structure F, see FIGS. 2, 3, 5 and 6, includes inner and outer side plates 30 and 32, respectively, secured to the loom frame between which extend pairs of bobbin cradles designated at 33, 34, 35 and 36 respectively front to back, each pair including a front cradle 37 and a rear cradle 38. The pair 36 is omitted from FIG. 5 to illustrate the rearmost cradle compartment. Each cradle has aligned gudgeons 39 at its ends turnable in bearings 40 in the side plates, and the cradles rock about substantially parallel axes. Each pair of cradles is in a compartment of structure F open at its upper end and tapering down to an outlet. From front to back (right to left in FIG. 5) the compartments are designated at 41, 42, 43 and 44 respectively, the compartments having walls 45 connecting the side plates as shown in FIG. 5 and converging downwardly toward the outlets. The corresponding outlets are designated 40*a*–40*d*.

The rear ends of the plates 30 and 32 are supported from an arch 25 of the loom frame by a brace 26. The front of the plates are secured to the magazine foot 161 and loomside supported brace 151, see FIG. 1.

*Cradle Rocking Mechanism*

For each pair of cradles there is a rocking mechanism C, see FIG. 2, which rocks first one of the pair and then the other of the pair. Each rocking mechanism includes a cam 46, see FIGS. 3 and 4, having a cam groove 47 which has a semicircular dwell portion 48 occupying about 180°, and an incline 49 and a decline 50 also occupying about 180° of the cam. The side of the cam opposite the groove has four lugs projecting therefrom which are equally spaced about a fixed stud 51 on which the cam turns. The axis of stud 51 is parallel to the axes of the gudgeons 39 of the associated cradles. The lugs are of unequal length, two diagonally opposite lugs 52 being long and the other two lugs 53 being short. A push pawl 54 and a pull pawl 55 are pivoted at their lower ends at 56 to an arm 57 pivoted at 58 to the inner side plate 30. The pawls are drawn toward each other by a tension spring 59. Each arm 57 has upper and lower lugs 60 and 61, respectively, see FIG. 3, which are adapted for cooperation wtih a color slide to be described. The front and rear cradles 37 and 38 respectively, see FIG. 4, of each pair have arms 64 and 65 formed with lugs 66 which fit into the groove 47 of the associated cam on opposite sides of the axis of stud 51.

The cradles are normally occupied by bobbins, each pair preferably having the same type of weft derived from its magazine to be described. The operation of rocking one pair of cradles, namely, pair 35, FIGS. 2 and 4, will be described, and this will suffice for all pairs, since they are alike.

It will be assumed that the parts are originally in the position shown in FIGS. 2 and 5 and that the color slide (to be described) registers with the lugs 60 and 61 corresponding to pair 33. Indication of weft depletion in the associated shuttle will cause lug 60 to be lifted, thereby raising arm 57 and causing push pawl 54 to lift the left-hand lower long lug far enough to rock the cam a one-quarter turn. The pull pawl 55 also rises as the right-hand upper long lug moves down and is replaced by the left-hand upper short lug which was previously at the left but will be under the pull pawl 55 when lug 60 has reached its top position.

The resulting one-quarter turn of the cam moves the lug 66 of the left-hand cradle as viewed in FIG. 2 along the incline 49 to the high point of the cam, thereby rocking the cradle to drop its bobbin, which falls along the left-hand inclined wall toward the outlet 40*a*. Meanwhile, the dwell of the cam has moved along the right-hand lug 66 in FIG. 2 (left-hand as viewed in FIG. 4), keeping it fixed so that the right-hand cradle remains at rest. The left-hand cradle is now empty and will remain so until the depleted shuttle which initiated the operation is about to return to the replenishing side. When that condition exists lug 61 will be depressed and pull pawl 55 will descend and move the adjacent top short lug down far enough to give the cam another one-quarter turn by coaction of decline 50 and lug 66, thereby completing a one-half turn of the cam and restoring the left-hand cradle to normal position, whereupon a bobbin drops into it. The two pawls and the lug constitute means to turn the cam 180° for each delivery of a bobbin. The right-hand cradle has not yet rocked, its lug 66 still being in the dwell part 48 of the cam groove.

The next time the same kind of reserve bobbin is called for the cam will be turned 180° from where it was at the beginning of the first turning operation and the lug 66 of the left-hand cradle will be held at rest by the dwell 48 while the incline 49 and decline 50 will move the right-hand lug 66 first to dump the bobbin from the right-hand cradle and then return it to normal to receive another bobbin.

It will thus be seen that two successive reciprocations of a pair of pawls will cause the cam to drop a bobbin first from one cradle of the associated pair, and then from the other cradle of the pair. Bobbins are thus drawn uniformly from pairs of bobbin stacks in a magazine above the cradles to be described.

Figure 32:
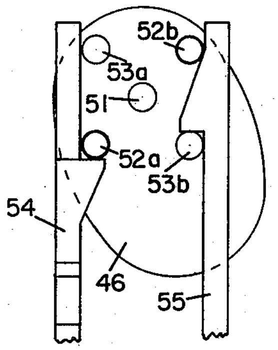
Figure 33:
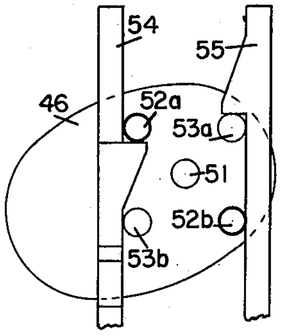
Figure 34:
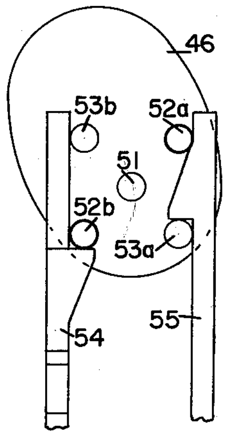

Referring further to the pawls and the long and short lugs, reference may be had to the diagrams of FIGS. 32 to 36 wherein the long lugs **52*a* and 52*b* are shown in heavy circles and correspond to lugs 52 already mentioned, and the short lugs 53*a* and 53*b* are shown in light circles and correspond to lugs 53 already mentioned. FIGS. 32, 33 and 34 show a normal sequence as already described starting with lug 52*a*** down in the lower left-hand position in FIG. 32, in upper left-hand position in FIG. 33, and in upper right-hand position in FIG. 34.

The cam 46 and lugs may be considered to be in a starting position when they are as shown in FIG. 32, and will have four successive one-quarter turns which will return them to the starting point. In assembling the parts, or as a result of repairs of adjustments, it may happen that cam 46 will be so located that lug **52*a* will be in the upper left-hand position when the pawl 54 is down, as shown in FIG. 35. The parts are wrongly placed in this last figure for the beginning of a cycle of two pairs of one-quarter turns to move the cam back to its starting position, but no harm will result when the pawls have an idle up motion, since pawl 54 in rising will not engage short lug 53*b*, and the pawls 54 and 55** will reach their high position shown in FIG. 36 without having turned the cam. Under this condition a cradle will be empty and no bobbin will be available for the first replenishing operation. If there is not enough reserve bunch on the indicating bobbin for a repeated call for transfer the filling stop motion will stop the loom. The weaver can then hand replenish the empty shuttle.

When the pawls reach the positions of FIG. 36, however, the pawls and lugs are in the same positions they would have been in if lug **52*a* had been down in FIG. 35. The parts are in the same position in FIG. 36 that they are in FIG. 33 during a normal cycle. The motion of the pawls from the position of FIG. 35 to that of FIG. 36 is idle, but harmless, and the next position after FIG. 36 will be the same as FIG. 34. It is thus seen that the pawls and lugs automatically take care of an angular misplacement of the lugs which may occur at the beginning of an operation. After catching up with the cycle as in FIG. 36, subsequent operations will be normal. The rod 70 and fingers 77–80 constituting the color slide may be considered to be actuating means which reciprocate the pawls and give the cam 46** and the lugs four successive one-quarter movements to complete a rotation of the cam. The color slide will be described hereinafter.

*Color Slide Control*

The color slide for raising and lowering the lugs 60 and 61 as already described is similar to color slides heretofore used on stationary magazines made by Crompton & Knowles Corporation, but has been modified for adaptation to the present invention. A rod 70, see FIGS. 2 and 5, is mounted for sliding and turning with respect to fixed bearings 71 at the front and back of the inside plate 30. The rear end of rod 70 has secured thereto a collar 72 formed with a peripheral groove 73 which receives the upper end of a placing lever 74 pivoted at 75. Lever 74 is connected to a flexible cable or chain 76 which extends across the loom and is moved in time with the shuttle boxes in the usual manner.

The rod 70 has lifting and depressing fingers 77–80 secured thereto for cooperation with the lugs 60 and 61 when the rod is rocked on its axis. There is one finger for each pair of lugs and the fingers are arranged along the rod so that only one of them can register with a pair at a time. Longitudinal shifting of rod 70 determined from the opposite side of the loom controls which finger shall register with its pair of lugs 60, 61.

The mechanism for rocking the color slide is shown in FIG. 24. A cam 85 on the bottom shaft 5 of the loom rocks a lever 86 pivoted about fixed stud 87 and connected at its forward end to an upright rod 88 which has a square sectioned block 89 on the upper end thereof. A lever 90 is pivoted between its ends to the block and has one end movable in a slot 91 across which a movable controller pin **91*a* normally extends. A weft detector 92 when detecting an ample supply of weft moves the pin out of the path of the lever 90, but when the detector indicates weft exhaustion or near depletion of the pin remains under the path of the lever so that the corresponding end of lever 90 is held up and the opposite end of the lever is moved downwardly as cam 85 effects descent of rod 88**.

The opposite end of lever 90 is pivoted to an upwardly extending rod 83 which is pivoted at 93 to an arm 94 which rocks on rod 70 between ears 95 on front bearing 71, see FIG. 5. Arm 94 has a slot 96 therein which receives a fin 97 of a casting 98 secured to rod 70. When said opposite end of lever 90 is depressed arm 94 moves fin 97 down, thereby rocking rod 70 to lift the fingers 77–80. On the next beat of the loom cam 85 acts to raise the left end of lever 90, FIG. 24, to depress any previously raised lug 61 registered with its finger. The color slide thus moves, or rocks, first in one direction and then in the opposite direction for each bobbin delivered. For a further description of the operation of the color slide reference may be had to U.S. Patent No. 1,030,748.

*Bobbin Tray*

Below the fixed structure F there is a movable means, shown here as a carrier or bobbin tray T, mounted for horizontal sliding movement from a normal registered loading position to any one of four positions to place a selected bobbin in the tray in position for movement toward the shuttle to be replenished. The tray has inner and outer walls 101 and 102, see FIG. 7, the bottoms of which ride along supports 104 fixed to structure F, see FIG. 2. The distance between the walls 101 and 102 is greater than the length of the bobbins and there are four elements or pockets 141–144 arranged front to back each having a pair of parallel cross rods 109 fixed to the tray. Resilient bobbin supports 110 have their upper ends curved around the rods 109, see FIG. 2, and have their lower ends curved to fit the sides and part of the under sides of the wound weft of the bobbins. Each support 110 has its upper end held to the associated rod 109 by a pin 111 which passes through the support and rod to fix the upper end of the support with respect to the tray, see FIG. 2. The lower end of the support can hold a bobbin in the tray and yield to permit downward removal of the bobbin and then spring back to supporting position. The rear ends of the walls of the tray have secured to them ears 112 which support aligned studs 113 on which are pivoted the forks 114 of a placing link 115. The ears are placed as shown in FIG. 7 so they can clear the supports 104.

The mechanism for shifting the tray link 115 includes a four pivot lever means or member 120 operatively connected to the tray or carrier and the plane of which is parallel to a vertical support 119 fixed to the loom frame. The manner of mounting the support is indicated in FIGS. 7 and 13. The loom includes in its fixed frame a member 116 to which are secured arms 117 extending from and fastened to the support 119. Any other convenient means for mounting the support 119 in fixed position can be used.

The support 119 has secured thereto four solenoids 121–124 each provided with a movable core 126 one end 127 of which is cylindrical to serve as a bearing. Support 119 has two stationary stops or seats 128 and 129 on which the lower parts of lever 120 normally rest in such manner as to align the cores of the solenoids with their respective bores 131–134 in lever 120. Link 115 is pivoted at 130 to the lower part of lever 120 and a lifter or actuator link 135 pivoted at 136 to the upper part of lever 120 is connected at its lower end to a bell crank lever 137 rockable about fixed pivot 138 by means to be described.

Under normal conditions lever member 120 is at rest on stop seats 128 and 129 and tray T is in normal position with its pockets 141–144 registered respectively with outlets *40a–40d* above them, see FIG. 9. The cradles will be occupied by reserve bobbins of the type corresponding to the bobbin stacks above them.

FIGS. 9 to 13 show diagrammatically the position the tray can occupy relative to the fixed structure F. FIG. 9 shows the normal position of the tray T with its pockets 141–144 registered with outlets *40a–40d*, and with lever 120 unpivoted and resting on stops 128 and 129. Cam 145 is at rest and actuator link 135 is in inactive low position. When a weft replenishing operation is to occur a solenoid will be energized and its core will become an active pivot for lever 120, establishing in effect a pivotal connection between support 119 and lever 120. Cam 145 will be given one rotation as will be described hereinafter and the tray will be moved to locate its selected pocket containing a bobbin in a neutral or transfer position designated at TP. The cam 145 serves as a control means for the actuator means for lever 120, the actuator means including link 135 and a lever operated by cam 145. An anvil 146 fixed to structure F over position TP prevents upward movement of a bobbin in position TP, as will be described.

The tray will be moved either to the left from the position shown in FIG. 9 if pocket 141 or 142 is to move to position TP, or to the right if pocket 143 or 144 is to move to position TP. Assuming that a replenishing operation is to involve a bobbin in pocket 141, solenoid 121 will be energized so that its core will enter bore 131 and become the selected pivot for lever 120, see FIG. 10. Immediately thereafter cam 145 will begin its one rotation and cause lug 147 in cam groove 148 to rock lever 137 to lift actuator link 135 and rock lever 120 until link 115 has moved the tray T to the left sufficiently to place pocket 141 under anvil 146 and in position TP. Rocking of lever 120 clockwise is limited by a fixed stop 149 over lever 137, see FIG. 10, the stop and cam 145 causing lever 137 to have the same stroke regardless of which solenoid is energized. The operation just described places a bobbin in pocket 141 in position for removal from the tray and movement toward the shuttle to be replenished, as will be described hereinafter.

If pocket 142 is to be moved to position TP, then solenoid 122 will be energized and lever 120 will swing around the core in bore 132, see FIG. 11, and move pocket 142 to the left into position TP. If pocket 143 is to be moved under anvil 146, then solenoid 123 will be energized and its core will become the selected pivot for lever 120, and rotation of cam 145 will move link 115 and the tray to the right, see FIG. 12, until pocket 143 is in transfer position. Finally, if pocket 144 is to be moved to position TP, then solenoid 124 will be energized and rocking of lever 120 by cam 145 will move the tray in a right-hand direction to place pocket 144 under anvil 146. Selector means in head K determines which solenoid shall be energized, and of course only one solenoid will be energized at a time. After each operation cam 145 serves as a return means to reestablish normal positioning of lever 120 on stops 128 and 129.

It will be noted that half of the pivots for lever 120 are on one side of a line joining pivots 130 and 136 and the other half on the other side, and for this reason half of the shiftings of tray T just described were to the left and half to the right, thereby reducing to one-half the length of the tray any shift required of it to be made away from the loading position of FIG. 9. Also, the right-hand end of lever 137 necessarily reaches the same elevation in FIGS. 10–13, but the bores 131–134, and pivot 136, are so placed that lever 120 is given two different angular positions, as in FIGS. 10 and 11, and two other similar but opposite hand angular positions, as in FIGS. 12 and 13.

*Bobbin Transporting Mechanism*

When the tray has been moved to place the selected bobbin in TP position under the anvil, mechanism comes into action to remove the bobbin from the tray and advance it toward and transfer it into the shuttle. This mechanism is shown in FIGS. 2, 7 and 14–19. In FIG. 7 the tray is in position to locate a bobbin for removal therefrom by a transport lever shown as gripping the rings of the bobbin.

Referring more particularly to FIG. 2, the previously mentioned transporting lever PL is secured to a shaft 160 rockable with respect to foot 161 of the fixed structure F held on the loomside 2. Part of foot 161 is broken away in FIG. 2 to show more clearly some of the structure behind it as seen in FIG. 2. Lever PL has a long arm 162 and a short arm 163 pivotally connected at 164 to a rearwardly extending link 165. The rear end of link 165 is pivoted at 166 (see FIG. 14) to a lever 167 pivoted on previously described fixed pivot 138. A lug 170 on the lower end of lever 167 is received by a cam slot 171 of a cam 172 which rotates with previously mentioned cam 145. The slot 171 receives lug 170 for a part only of the rotation of cam 172, and releases the lug during the remainder of the cam rotation, exposing the ungrooved part, or surface 173, for cooperation with the lug, but permitting the lug to move away from surface 173 if need be.

The arm 162 has provision at its free end for gripping the butt end of a bobbin. The bobbin to be gripped, shown at B in FIG. 7, has a butt 175 with the usual rings 176, a mass of weft W wound on it in such manner as to have a cylindrical part 177 ending in a conical part 178, and has a tip 179 provided with a small threading bunch 180 of weft. The end of lever PL has spring jaws 181 formed with grooves to fit partway around and hold the rings on the bobbin butt.

The lever PL has a laterally extended lug 182 which normally rests on the rearwardly extending part 183 of a bobbin transferrer arm 184 which is rockable on a relatively large and strong stud 185 supported by support 151 on base 153 of foot 161, see FIG. 2. Arm 184 has two spaced depending parts 186, see FIG. 19, between which is a transferrer latch 187 swingable about a stud 188 carried by said parts for engagement with a bunter 189 on the lay L, see FIG. 18. The transferrer arm 184 normally is held yieldingly in the raised position shown in FIG. 15 by the usual coiled spring (not shown), and latch 187 normally down, as in FIG. 18.

The transferrer arm 184 has a finger 190 formed with a curved edge 191 which is concentric with stud 160 when the transferrer arm is in normal raised position. When the arms 162 and 184 are in normal position, arm 162 can rise and arm 184 is free to rock, but when arm 162 rises edge 191 and surface 192 of lug 182 interlock, and when arm 184 begins a bobbin transfer movement lower edge 193 of finger 190 concentric with stud 185 passes over lug 182 and the arms are again interlocked. It should be understood when viewing FIG. 19 that shaft 160 is considerably higher than stud 185, see FIG. 2.

The mechanism for setting the loom for a replenishing operation is shown in FIGS. 14–18 and includes a fixed stud 196 on which are swingably mounted a shuttle feeler 197, a latch lifter 198, and a friction holding arm 199 to move between two stationarily mounted friction springs 200. A slender lifter arm 201 fast with arm 163 has a head 202 to engage the feeler 197 to rock it and the parts 198 and 199 which move with it when the loom is set for replenishment.

Lever PL is normally in the intermediate position of rest shown in FIG. 15, and when it is to be brought into play, cam 172 will be set into rotation, this cam acting as an actuator for the lever. The stud 170 will be moved to the left by groove 171 to lift arm 162, see FIG. 14, to discharge position enabling arm 162 to take the bobbin in the tray pocket in position TP by grasping its butt by the spring jaws 181. At the same time, lifter 201 will be moved to the left and roll or head 202 will engage the shuttle feeler and move the parts 197, 198 and 199 and the latch 187 from the position of FIG. 18 to that of FIG. 15. The transfer mechanism is thus set with the latch in the path of bunter 189.

As cam 172 continues to turn it moves lever 167 to the right, FIG. 14, thus moving arm 162 down until lug 182 again engages part 183 of transferrer arm 184 and depressor finger 190. This is the normal position of arms 162 and 184, the latter being held up as mentioned in its highest position, and a bobbin now being held by arm 162 in a position spaced from the shuttle. At about this time in the cycle of the loom the lay bunter 189 strikes latch 187 and rocks the transferrer arm 184 counterclockwise as viewed in FIG. 16, moving surface 206 of finger 190 against lug 182 and pushing arm 162 down as arm 184 turns. This happens between the positions of FIGS. 15 and 16, the latter figure showing lug 182 at the right-hand end of surface 206. During this descent of arm 162 it cannot move up relatively to arm 184 because of engagement of lug 182 with surface 206, nor can it move down with respect to arm 184 because of engagement of the bottom of lug 182 with surface 207, see FIG. 19, of part 183 of arm 184. The two parts 162 and 183 therefore move together to the position of FIG. 16, the bobbin butt heel 208 of arm 184 remaining above the bobbin in the jaws of arm 162.

As the lay continues its advance it causes the curved concentric surface 193 to pass over curved surface 209 of lug 182 while the under side of arm 162 engages stop 210. Arm 162 is thus held stationary from the position of FIG. 16 to that of FIG. 17 so that the heel 208, by continued motion, moves the bobbin from arm 162 into the shuttle S. Bobbin transfer is complete when the lay reaches its front center position, as shown in FIG. 17, and as the lay recedes arm 184 rocks clockwise to its normal position, FIG. 18, lifting arm 162 with it.

When the lay approaches front center the rear end of shuttle feeler 197 is struck by a part 212 of the lay, see FIG. 17, to rock the shuttle feeler, latch support and holding arm 199 clockwise, moving the latter away from the friction holding springs 200 and enabling the parts to fall to the normal position, FIG. 18. By this time in the loom cycle roll or head 202 is considerably in advance of the shuttle feeler, and as arm 162 returns upwardly to its normal intermediate position, FIG. 15, being lifted by the transferrer arm 184, the roll will move rearwardly but will not interfere with the resetting movement of the shuttle feeler.

With respect to the operations just described, it should be noted that cam 172 has the exposed or ungrooved part 173 to permit free motion of lug 170 when arm 162 is under control of the transferrer arm. Also, the latch lifter 198, which holds the latch in the path of bunter 189 after lifting it, acts as part of a revoking means should the shuttle be improperly placed and strike the shuttle feeler as the lay advances. In that event, the hooked end 216 of lifter 198 will be swung forwardly into a depressor 217 on the under side of the latch to move the latter downwardly positively and prevent a faulty transfer operation. Another point to be noted is that the studs 160 and 185 are so placed and the lengths of arm 162 and part 183 of arm 184 are such that heel 208 will be out of the path of the bobbin being moved down by arm 162, and then after the bobbin has moved under the heel, both bobbin and heel can descend in proper relation for transfer, of the bobbin into the shuttle.

*Selective Electric Circuits and Cams*

The fixed structure F has mounted thereon four electric switches 221–224, arranged front to back of the loom, each associated with a cradle operating mechanism. These switches are mounted on the fixed structure F, see FIGS. 2 and 3. One of the switches, namely, 223, is shown in detail in FIG. 3. All of the switches are alike and the following description of switch 223 will suffice for all of them.

The part 366 of frame F, see FIG. 3, has secured thereto by screw 215 a holder 216 which has a switch 217 secured thereto by screws 218. A resilient arm 219 fastened to the switch 217 is positioned to raise switch plunger 220 to close the switch when the associated push pawl 54 rises. This will close the switch and keep it closed until the pawls 54 and 55 are lowered by the color slide.

The switches 221–224 are connected by wire 225 to an electric transformer 226 and are normally open. Each will be closed by its corresponding push pawl 54 and remain closed so long as the pawl is in raised position, but will open when the pawl descends. More than one of the switches 221–224 can be closed at a time.

*One Rotation Clutch and Cams*

The previously described cams 145 and 172 are arranged to be given one complete rotation by the means shown in FIGS. 8 and 27. The top or crank shaft of the loom has a gear 230 secured to its meshing with an equal gear 231 supported by and rotatable on a normally stationary shaft 232 which, however, is rotatable in bearings on the loom frame. The cams 145 and 172 are each keyed to shaft 232 as is also a magnetic clutch 233 having a coiled winding 234 the ends of which are connected to collector rings 235 and 236. The windings surrounds a core 237 on the clutch made of magnetic material, and when brushes 238 and 239 are energized the rings conduct electric current which causes the gear 231 to turn the clutch and shaft 232 and the cams secured to it.

In describing the circuits shown in FIG. 8 it may be assumed that shuttle S1 has indicated depletion of weft and that the corresponding cradle rocking means 33 has had its pawls 54 and 55 raised, as already described, to close switch 221. Assuming further that shuttle S1 is to return to the replenishing end of the loom, a circuit will be closed from transformer 226, switch 221, wire 240, solenoid 121, wire 241, contact 21, arm 20, wire 242, switch 243 (at a given time in the loom cycle), wire 244, electromagnet 245, and wire 246 back to the transformer. When this circuit is closed electromagnet 245 attracts armature switch 247 (to dotted lines, FIG. 8) to close the following circuit: line L1 of an electric power source, switch 247, wire 251, brush 238, ring 236, winding 234, ring 235, brush 239, and wire 252 to line wire L2. The magnetic clutch thus energized immediately begins to turn with gear 231 and a tappet 253 moving with the clutch moves from under switch arm 254, whereupon switch 255 closes the following circuit: electric power source 256, switch 255, wire 257, holding relay 258 and wire 259 back to source 256. Energizations of relay 258 enables it to attract magnetic arm 260 fixed to armature switch 247, thereby holding the clutch circuit closed after rotary switch 243 is turned far enough by the loom to open the circuit of electromagnet 245. The clutch remains energized while gear 231 makes practically one rotation, thus rotating the cams 145 and 172 to perform their functions, as already described. As the clutch nears the completion of its rotation tappet 253 raises arm 254, thereby opening the circuit on relay 258 and enabling spring 262 to open switch 247 and the circuit through coil 234. The clutch and cams on shaft 232 and the latter thereupon stop turning and are in readiness for the next replenishing operation. FIG. 28 shows simple means for holding the shaft 232 and its cams against undesired angular movement from the position just described. A cam 338 secured to shaft 232 has a notch 248 to receive roll 249 on an arm 250 pivoted at 261 and held in the position of FIG. 28 by spring 263.

If in the foregoing shuttle S1 had to be moved out of action upon arrival at the head end of the loom, then arm 20 would have moved away from contact 21 and the circuits described would not have been closed until shuttle S1 was again to return to action.

Should any one of the shuttles S2, S3 or S4 close its respective switch 222—224 the foregoing circuit would be closed as described except that the corresponding solenoid 122–124 would be energized.

In FIG. 27 the gears 230 and 231 are equal so that shaft 232 has a rotation in one pick of loom time, that is, the cams 145 and 172 complete their rotations in one beat of the loom. If more time is required for some of the operations of the loom gear 231 could be larger than gear 230, for instance, half as large again, so that such operations can be slower and subject to less wear and tear. Since the loom shown operates on a two-pick cycle the ratio of gear 231 to 230 should not exceed 2 to 1.

*Bobbin Tip Bunch Remover*

Each reserve bobbin to be acted on by the replenishing mechanism will have a small weft bunch 180 wound on its tip and connected to the working mass of weft or yarn wound on the bobbin. This bunch is removed while the bobbin is in the placer or transport lever PL and moving toward the shuttle it is to replenish. Three forms of tip bunch removers are shown herein, the preferred form being shown in FIGS. 7 and 20.

As seen in FIG. 7, the shaft 160 to which lever PL is keyed (FIG. 14) has also keyed thereto an arm 270 having at its free end a guide 271 in which is slidably mounted a remover hollow head 272 in axial alignment with a bobbin which is being held by arm 162. The head 272 is hollow and has at its left end, see FIG. 20, an opening 273 to receive the tip of a bobbin. A flange 274 around opening 272 together with a circular shoulder 275 spaced from it define a space to receive a soft elastic member 276, such as rubber, having a cylindrical body 277 and flexible inwardly extending frustro-conical members 278 and 279. Cone 278 fits snugly against the conical part 178 of the wound weft W on the bobbin when the remover is moved to the position shown in FIG. 20 to prevent unwinding of the weft and also prevent air within the head from escaping to the left, FIG. 20. The other cone 279 fits around the tip 179 of the bobbin just beyond, or to the right of, threading bunch 180. The cones in their normal shape are aligned and extend almost across the cylindrical body 277 and are deflected to the shape shown in FIG. 20 when head 272 slides to operating position.

Head 272 has an air inlet passage 285 aligned with a hole 286 in body 277 and a flexible pipe or tube 287 which fits into inlet 293 of head 272, is arranged to introduce compressed air into the elastic member 276, as will be apparent from FIG. 20, to exert pneumatic pressure to the left on cone 178 and to the right against the bunch 180, blowing it to the right of the remover head. Arranged along the air passageway 290 of the head 272 are inwardly projecting snares 291 bent in the direction of air flow to catch the weft ring or bunch 180 when the shuttle is picked after its replenishment. The cone 279 requires the escaping air to move along the bobbin tip and exert a force on the bunch which removes it, the air temporarily opening the cone 279 for the purpose.

The first modified form of bunch remover is shown in FIG. 21. A hollow remover head 295 has an inturned flange 296 to the outer surface of which a washer 297 is secured by screws 298. The washer serves to clamp a centrally punctured soft elastic diaphragm 299 in place. Freely rotatable in head 295 are two small paddle wheels 300 having flexible or resilient paddles 301 which conform to the bobbin tip as shown in FIG. 22. Air passages 302 communicate with pipes 303 connected to a source of compressed air (not shown). Air moves against the paddles by following paths suggested by the arrows at the bottom of FIG. 21 to turn the wheels so that their paddles move along the bobbin tip in a direction away from the wound weft on the bobbin. The paddles and air remove the threading bunch and move it along passage 304 which is similar to passage 290 in FIG. 20. The diaphraghm 299 acts much in the same manner as does cone 278. The head 295 slides in a bearing 305 similar to bearing or guide 271.

The second modified form of remover, shown in FIG. 23, has an enclosing hollow cylinder 310 in the left end of which is secured a bearing member 311 to the left end of which is secured a soft elastic diaphragm 312 mounted and acting as the corresponding part 299 in FIG. 21. Slidable in the bearing is a piston 313 the left end of which has flexible resilient means 314 to slip over the bunch 180 when the head 310 is moved to the position of FIG. 23 relative to the bobbin. The bearing member has an inlet 315 for compressed air. The piston 313 is surrounded by a spring 316 which normally pushes a shoulder 317 fast with the piston against the right-hand end of the bearing 311. When air is introduced through inlet 315 it pushes the piston to the right against the action of spring 316 and causes resilient means or fingers 314 to strip the bunch off the bobbin tip, after which the compressed air blows the bunch along passage 318 similar to passage 290. A slide bearing 319 similar to guide bearing 271 is provided for head 310.

In all forms of the remover a slide bearing such as 271, 305 or 319, is provided on arm 270, or its equivalent. The means for moving the remover to bunch removing position and then back to normal idle position is shown in FIG. 7 and includes an actuator lever 325 pivoted at 326 to arm 270. The left-hand end of lever 325 is forked to extend above and below head 272 and each forked part is slotted at 324 to receive a pin extending from the head. One of the forks is shown at 327 in FIG. 7 and a pin at 328. Lever 325 is rocked by mechanism to be described whenever a replenishing operation is called. The remover does not move to active position until arm 162 has completely grasped the incoming bobbin, and it must have performed its function of removing the bunch and returned to inactive position before the arm 270 gets low enough to strike the shuttle.

The mechanism shown herein in FIGS. 7 and 28 for reciprocating the head of the bunch remover includes a cam on shaft 232 and a lever operated by the cam and having a push-pull connection with lever 325. A collar 330 slidable on shaft 160 has a circular slot 331 which receives the yoked end 332 of lever 325. The core 333 of the push-pull connection is fastened to collar 330 at 334 and extends through and is slidable within a coiled sheath 335. The sheath has its ends secured in position by fixed clamps one of which 336 is near the forward end (right end as seen in FIG. 7) and the other of which 337 is near shaft 232. The cam 338 already mentioned in connection with roll 249 is secured to shaft 232 and has a groove 339 for a roll 340 on a lever 341 pivoting on fixed structure 138. The adjacent end of core 333 is secured to lever 341 and when the latter rocks due to turning of cam 338 the core causes lever 325 to rock around pivot 326 to effect removal of the weft bunch on the bobbin tip.

*Removable Bobbin Magazines*

An important object of the invention is to provide a removable reserve bobbin carrier which can be filled with bobbins having wefts of different types, such as color, in a winding room and then be taken to a loom and be placed in operative relation with respect to the various structures already described. This feature of the invention is shown in FIGS. 1, 2, 3 and 6, and as set forth herein comprises four magazines each comprising a pair of stacks or compartments for holding wound bobbins, each pair if desired having a weft supply distinctive from that of the other pairs.

Referring particularly to FIG. 2, the magazine structure M has front and back vertical flat walls 350 and 351 respectively, and right and left-hand similar side walls 352 and 353 respectively, see FIGS. 1 and 29. Partitions 354 extending vertically between and secured to the side walls divide the interior of the magazine into pairs of vertical compartments to receive reserve bobbins. The pairs of compartments, reading front to back, right to left in FIG. 2, are designated at 361, 362, 363 and 364.

Means are provided for supporting the bobbins in the various compartments while the structure M is being transported to the loom and then moved to release the bobbins so they can pass to the cradles when needed. Slidably mounted in the lower part of each side wall 352, 353 is a bar 345. One of these bars is shown in detail in FIG. 3 and is formed as shown therein to fit a similarly shaped slot 346 in the adjacent wall. The bobbins have tips 179 and butts 175 and the bars 345 have lugs to support the butts and tips. The bar for the inner wall 353 has a lug 348 for each stack of bobbins to engage and support the bobbin butts, or more strictly, the rings 176 of the butts. The bar for the outer wall 352 has a lug 347 for each stack of bobbins to engage and support the bobbin tips. The lugs 347 are slightly higher than lugs 348 due to the diameter of the tip being less than that of the butt.

The fixed structure F has a supporting ledge 365 and a restraining guide 366 for the bottom of each side wall of the structure M, FIG. 3 showing a ledge and guide for one of the side walls. The ledges 365 are horizontal and the bottoms of the walls 352 and 353 can slide along them to the correct position for alignment with the cradles.

Means are provided for handling the magazine when it is to be put in place on the fixed frame F, this means being arranged to lock the magazine in place on frame F and also release the bobbin supporting lugs 348 and 347. The front and back walls 350 and 351 respectively are each provided with a handle, a lock rod and bearings for them. One of these arrangements will be described, namely, the one for the front wall 350. The other arrangement for the rear wall is similar except for the bobbin supports it controls.

Near the upper right-hand part of front wall 350 two bearings 370 are affixed to the wall and support a shaft 371 for rotation, see FIG. 29. A handle 372 is secured to shaft 371 and has a stop arm 373 which by engagement with wall 350 limits upward motion of the handle. An arm 374 also secured to shaft 371 is pivoted to a link 375 the lower end of which is pivotally connected at 376 to a vertical lock rod of bolt 377. The bolt is slidable in bearings 378 fixed to the wall 350 and adjacent to its lower end has a laterally projecting pin 379 which extends into a diagonal slot 380 in the end of the corresponding bar 345 (shown for the rear handle in FIG. 2). The frame F has a hole 381 placed to receive each rod 377 when it is pushed down, provided structure M is correctly placed. The rods 377 and the holes 381 provide detachable means for holding the structure M in place of frame F.

When a filled magazine is being moved to the loom it will be held by its handles 372 which will be in the raised position shown in FIG. 29. Lock rods 377 will therefore be raised and pins 379 will be in the upper ends of their slots 380, thereby holding the bars 345 to the left, FIG. 2, to place the supports 348 and 347 under the butts and tips of the lowest bobbins in the magazine. While still being held by the handles the bottom of the magazine will be fitted onto the ledges 365 between the guides 366 and the magazine slid along the ledges until the rods 377, by downward force exerted manually on the handles, enter the holes 381, thus locking the magazine in place on the frame F. When the rods 377 descend their pins 379 are pushed down and act on the bars 345 to move them to the right as viewed in FIG. 2, thereby moving the supports 348 and 347 to bobbin releasing or non-supporting position, whereupon the lowest bobbins in the several stacks of the magazine are free to fall into their cradles when called upon to do so.

When the stacks of the structure M are empty of bobbins, or nearly so, the attendant will lift the handles, thereby shifting the bars 345 to place supports 348 and 347 under any bobbins which may remain in the magazine, and when stops 373 limit further angular movement of the handles and rods 377 are out of their holes 381, the magazine can be slid along ledges 365 for removal from the loom. Thereafter, a similar magazine structure filled with wound bobbins can be put in place and operation of the loom continued without interruption. The empty structure can then be returned to the winding room for filling with a fresh set of wound bobbins.

The several magazines are integrated with the structure F to form a unit wherein the bobbin butt and tip supports are moved into bobbin supporting or restraining position when the handles are raised to transport the unit, but move to releasing position when the handles are pushed down to lock the magazine unit in position. The cradles may be considered to be means permanently mounted on the fixed frame F which advance bobbins from the stacks to their corresponding outlets at the bottom of frame F. The fresh structure M just placed on the loom will have its bobbin groups registered with the cradles by rods 377 in holes 381.

*Time Chart and Operation*

The foregoing gives a detailed description of the structures and operations of the several mechanisms utilized in the invention and it remains now to describe the time relations and operation of the several devices by reference to the time diagram shown in FIG. 25.

It will be understood that the usual parts of the loom operate in ordinary manner except as noted. The loom will have a driving motor and the top shaft will give the lay a back and forth reciprocation for each beat, or weft laying operation. The shuttles will be picked one at a time and in an order determined by the pattern chain and vibrator levers 10 and 11. Detection of weft exhaustion when the depleted shuttle is on the replenishing size will be followed two picks or beats later by replenishment of the shuttle, provided the shuttle returns immediately. The loom will not be provided with the usual thread holder for weft ends of the reserve bobbins, but can be equipped with thread cutters and removers, and if a replenishing operation is revoked there will be sufficient reserve weft on the bobbin for a repeated indication of exhaustion without causing loom stoppage by the weft stop motion.

In FIG. 25 the letters FC1, TC1, BKC1, and BTC1 represent front, top, back and bottom centers of the first pick or beat of operation, FC2, TC2, BKC2 and BTC2 represent the second beat, and FC3 and TC3 the beginning of the third beat, the sequence beginning with a shuttle S1 at the replenishing end, right-hand side of FIG. 1, and the lay at front center so that the weft detector is detecting the weft in shuttle S1. If ample weft is present the feeler, or detector, gives no indication of depletion and the loom continues to run in usual nonreplenishing manner. It will be assumed, however, that shuttle S1 is depleted of weft to cause the feeler to indicate exhaustion, see block II, FIG. 25.

The color slide has its finger 77 registered with the front pair of lugs 60 and 61 and has been rocked by detector lever 90 to raise the front pair of pawls, block III, FIG. 25, thereby dropping the bobbin in one of the cradles of the front pair 33 through outlet 40*a* and into tray pocket 141 and also closing switch 221, block IV. The shuttle S1 will be picked at or about at top center TC1, block V, toward the head or left end (FIG. 1). During the latter part of the flight of the shuttle the vibrator levers 10 and 11 that determine which shuttle will be picked back from the left to the right will be in stationary control position, block VI, FIG. 25, and switch 20 will be positioned for the conditions prevailing during the next shuttle flight.

Any one of shutles S2, S3 and S4 can be picked back to the magazine end, in which event switch 20 will be away from contact 21 and switch 221 will remain closed until shuttle S1 is again active. It will be assumed that shuttle S1 will return and that switch 20 will engage contact 21 some time before the shuttle box gang LG begins to shift. Shuttle S1 boxes at BTC1 and the box shifts begins, block VII. Timer switch 243 then closes, see block VIII FIG. 25, and remains closed long enough to set relay 258.

As soon as switch 243 closes due to loom running an electric circuit will be closed through solenoid 121 and pivot 131 will be established with respect to lever 120, see block IX. Closure of switch 243 also closed the circuit of the holding relay, see block X, and also closed the circuit of the clutch, see block XI, the clutch remaining energized after switch 243 opens.

Rotation of cam 145 causes the tray to move to locate pocket 141 in position TP, see block XII, and simultaneous rotation of cam 172 starts transport lever PL on its upward motion to grasp the bobbin in pocket 141. The transport lever, of course, will not reach the bobbin in pocket 141 until the tray has moved that pocket to position TP and dwells temporarily, after which the tray returns to normal position, all as in block XII. Block XIII indicates the motion of the transport lever, which starts up in time to be fully up to take the bobbin in pocket 141 during the dwell of block XII. The transfer latch 187 is raised as arm 162 rises and is set for transfer during the dwell of block XII, see block XIV. The latch will remain up, as described, when arm 162 moves down. During down motion of the transport lever the bunch remover comes into action as shown in block XVI, the bunter 189 engages the latch, block XV and the transport lever and transferrer arm are interlocked, block XVII.

Operation of certain parts of the loom are not indicated in detail in FIG. 25, such as the weft detector, connection between gang LG and the color slide, or the gearing in the head. If the shuttle upon its return does not box properly and the called transfer is revoked, such revocation will occur, as usual, due to engagement of the shuttle with the shuttle feeler 197 before the lay bunter can engage the latch, and will occur before block XIV marked "Bunter" is reached.

As specifically shown herein the rotation of the cam shaft 232, block XI, will begin about or at FC2 and end about FC3, but the bunter will remain engaged with the latch until the lay has begun its rearward motion and will pull away from the latch after FC3, as usual. It should be understood, however, that rotation of shaft 232 can begin earlier than as indicated in block XI. Its rotation can, in fact, begin very shortly after the time for vibrator levers 10 and 11 to be in control position, in which event more time will be available for some at least of the operations described herein.

*Summary*

From the foregoing it will be seen that the invention sets forth a removable multi-magazine arranged to hold wefts of varying characteristics, such as color, which when placed in a loom has the wefts registered with the releasing or delivery cradles corresponding to them. The cradles are arranged in pairs matching the pairs of bobbin stacks and the pawl and cam mechanism for each pair of stacks draws bobbins first from one stack, then the other, thereby depleting the stacks uniformly. The means which lowers a pair of previously raised pawls can be controlled by connections with the gang LG, or with the head K, but the movement of the tray to place a previously received bobbin in TP position is controlled by the vibrator levers in the head at a time earlier than would be possible by a control derived from the shuttle boxes LG. The bobbin tray is moved from its normal position to place a selected bobbin in position TP by a one-rotation cam acting through lever 120 in such manner that the tray is never moved more that half of its length. The bobbin transport mechanism moves a bobbin positively from the tray to a position under the transferrer arm. The transport lever PL is operated by a one-rotation cam and raises the transfer latch when rising and when descending keeps the tip bunch remover aligned with the bobbin to be transferred. The tip bunch remover is operated by a one-revolution cam during part at least of the time the lever arm 162 is descending from its high position. The selective electric circuits each contains a switch closed when the weft detector indicates weft exhaustion and also a contact in the head corresponding to the first switch, and all of these circuits are common to the timer switch 243. The electromagnetic clutch acts to cut itself off after one rotation, but it is to be understood that the invention is not limited to the particular form of clutch shown herein. The clutch can for instance take more than one beat of the loom to complete its reaction. The magazine carries bobbins of diverse types in stacks which register with their respective cradles and pockets in the tray when the lock rods are put in place by down motion of the handles. Also, when the handles can be put down due to registry of the lock rods 377 with the holes 381 in the frame F the supports for the butts and tips of the bobbins in the magazine are moved to nonsupport position so that the bobbins can fall into their cradles. A freshly changed replenishing structure M can be put in place as a substitute for a structure removed with assurance that the stacks will register with their cradles and outlets at the bottom of frame F, and with their pockets in the tray T.

I claim:

1. In a multicolor weft replenishing loom, a stationary frame to receive bobbins having different weft characteristics, a reserve bobbin holder above said frame and including a plurality of magazines, and supported by the frame, each having provision for holding a group of wefts distinctive from wefts in the other magazines, a bobbin outlet on the frame for each magazine, detachable locking means to hold the bobbin holder in fixed position on the frame to retain the magazine in register with their respective outlets, the detachable locking means enabling the bobbin holder and its magazines to be removed and be replaced by a similar bobbin holder and its magazines registered with their respective outlets, and means movable on the frame having a pocket for each outlet to receive bobbins from the outlets and advance them toward a position from which they can be transferred into a shuttle.

2. The loom set forth in claim 1 wherein each group of wefts includes two parallel vertical stacks of reserve bobbins and the magazines are arranged side by side, each group being in register with an outlet on said frame.

3. The loom set forth in claim 2 wherein each outlet is associated with a pair of bobbin delivery cradles, one cradle for each stack of reserve bobbins.

4. The loom set forth in claim 1 wherein the detachable means are plungers movable on the bobbin holder to enter holes in the frame.

5. The loom set forth in claim 1 wherein the detachable means are movably mounted on the bobbin holder for cooperation with the frame, and carrying handles for the bobbin holder are operatively connected to the detachable means and when moved down move the means into holding position and when raised incident to removal of the bobbin holder act to move the detachable means to nonholding position.

6. The loom set forth in claim 1 wherein the magazines are integrated into a unit and supports for the butt and tip ends of bobbins are movably mounted on the unit and carrying handles on the latter operatively connected to the supports act when raised to lift the unit to move the supports into bobbin supporting position and act when depressed after the unit is in place on the frame to move the supports to bobbin releasing position.

7. In a weft replenishing loom having two stacks of reserve bobbins in a reserve bobbin holder and a pair of parallel pivoted bobbin delivery cradles mounted on a fixed frame below said holder, one at the bottom of each stack, a cam rotatable about an axis parallel to the axes of the cradles having dwell and working surfaces each of substantially 180° extent, an arm secured to each cradle operatively related to said cam, the arms being on opposite sides of the axis of the cam, and turning means effective to turn the cam 180° for each delivery of a bobbin from said stacks, the means when giving the cam a half-turn causing the dwell of the cam to hold one arm and its cradle stationary while causing the working surfaces of the cam to rock the other arm and other cradle first in one direction and then in the other direction to deliver a bobbin from one stack, and means when giving the cam its next half-turn causing the dwell of the cam to hold the other cradle stationary and cause the working surfaces of the cam to rock said one arm to effect delivery of a bobbin from the other stack.

8. In a weft replenishing loom having two vertical stacks of bobbins in a reserve bobbin holder and a bobbin delivering cradle beneath each stack and mounted on a stationary frame below said holder, a cam rotatable between the cradles effective by a single rotation thereof to rock first one cradle and then the other to deliver a bobbin from each stack, a member which moves first in one direction and then in the opposite direction for each delivery of a bobbin, and actuating means effective on the first movement of the member in said one direction to turn the cam a one-quarter turn and effective on the first movement in said opposite direction to turn the cam a second one-quarter turn, thereby delivering a bobbin from one cradle, and effective on the second movement of the member in said one direction to turn the cam a third one-quarter turn in said one direction and effective on the second movement in said opposite direction to turn the cam a fourth one-quarter turn, thereby delivering a bobbin from the other stack and returning the cam to its original position.

9. A loom as set forth in claim 8 wherein said actuating means includes two pawls moved by the member, one of said pawls effective on movements of the member in one direction to exert a pushing force to impart one-quarter turns to the cam and the other pawl effective on movements of the member in the opposite direction to exert a pulling force to impart one-quarter turns to the cam.

10. A loom set forth in claim 9 wherein the cam has four lugs located at the corners of a square and two diagonally opposite lugs are longer than the other two lugs and one of said pawls engages the longer lugs only.

11. In a loom having a tray to be moved from a normal position to locate any one of a plurality of bobbin pockets therein in a common position, a stationary support, lever means operatively connected to said tray, a plurality of pivot means for the lever, one corresponding to each pocket, spaced from each other and each capable of movement from a normal inactive nonpivot position to an active pivot position to establish a pivotal connection between the support and the lever means, an actuator connected to the lever means to rock the latter about any pivot means in active pivot position, selector means determining which of the pivot means shall move to its active pivot position, and control means for the actuator causing the latter to rock the lever means after one or another of the pivot means has been moved to active position by the selector means.

12. The loom set forth in claim 11 wherein the actuator puts power into the lever at one point and another point of the lever is operatively connected to the tray, and one half of the pivot means are on one side of a line joining said points and the other half of the pivot means are on the other side of said line.

13. The loom set forth in claim 12 wherein the pivot means on one side of said line when in active position cause the tray to move in one direction and the pivot means on the other side of the line when in active position cause the tray to move in the opposite direction when the lever means is moved by the actuator.

14. The loom set forth in claim 11 wherein the actuator includes a link pivotally connected to the lever means and to a moving member, and the moving member always moves the same distance when the actuator rocks the lever means regardless of which pivot means is in active pivot position.

15. The loom set forth in claim 12 wherein the stationary support has two stops for the lever means, one on each side of said line, and return means normally moves the lever means against said stops to return the tray to its normal position after a movement of the lever means by the actuator.

16. In mechanism to selectively place each of a plurality of elements of a loom in a delivery position, each element associated with a distinctive weft of the loom, a carrier for the elements, a lever operatively connected to the carrier, means to establish a plurality of pivotal supports for the lever, said pivotal supports normally in nonpivot inactive position but each capable, independently of the others, of moving to active pivot position, actuator means connected to the lever at a point intermediate said pivotal supports, selective means to cause said pivotal supports, one at a time, to move to pivot active position relative to the lever, and control means for the actuator causing the latter to move the lever about a selected pivotal support in active pivot position, after the selective means has selected a pivotal support, there being a pivotal support for each element and the element which is moved to the delivery position depending upon which support is selected by the selective means.

17. The mechanism set up in claim 16 wherein the elements are bobbin receiving pockets of a tray movable under a reserve bobbin magazine.

18. In a loom having a movable tray provided with a plurality of reserve bobbin pockets, selective means operatively connected to the tray effective to move the tray to locate any pocket in a given discharge position, a transport lever normally in a position of rest having bobbin gripping means thereon, actuator means for the lever causing the latter to move to any pocket in said discharge position and grip the bobbin in the pocket and then move the bobbin to a position spaced from a shuttle to be replenished by the bobbin, and a transferrer arm effective thereafter to move the bobbin from the transport lever into the shuttle.

19. The loom set forth in claim 18 wherein the transport lever and transferrer arm have interacting locking means which hold the lever in fixed position above the shuttle during movement of the bobbin out of said gripping means by the transferrer arm.

20. The loom set forth in claim 19 wherein the transferrer arm subsequently returns to its normal position and lifts the lever and thereafter supports it in its normal position.

21. The loom set forth in claim 19 wherein said interacting means includes a lug on the transport lever resting on the transferrer arm in position to be moved down by a depresser finger on the transferrer arm.

22. The loom set forth in claim 21 wherein a fixed stop limits down motion of the lever and the lug and finger have cooperative surfaces concentric with the transferrer arm effective to prevent upward movement of the lever when a bobbin is being moved out of said gripping means.

23. In a multi-color weft replenishing loom operating with a multi-color bobbin holder and with shuttle boxes shiftable to place each of a plurality of shuttles in picking position, a fixed structure below said bobbin holder and including a cradle means corresponding to each shuttle to receive bobbins from said holder to facilitate movement of a bobbin corresponding to a depleted shuttle toward the latter, a separate magazine on said bobbin holder and having a group of bobbins for each cradle means, and detachable locking means to fasten the bobbin holder in place on the fixed structure with the groups of bobbins registered with their corresponding cradle means.

24. In a multi-color weft replenishing loom, a stationary frame to receive bobbins having different weft characteristics; a reserve bobbin holder above said frame and including a plurality of magazines and supported by the frame, each having provision for holding a group of wefts distinctive from wefts in the other magazines, a bobbin outlet on the frame for each magazine, detachable locking means to hold the bobbin holder in fixed position on the frame to retain the magazines in register with their respective outlets, the detachable locking means enabling the bobbin holder and its magazines to be removed and be replaced by a similar bobbin holder and its magazines registered with their respective outlets, and means on the bobbin holder and its stationary frame remaining permanently connected thereto when the magazines are detached and effective when a freshly filled bobbin holder is attached to the frame to advance bobbins from the magazines toward their respective outlets.

25. In a bobbin cradle operating means, a cam requiring two pairs of successive one-quarter turns to return to a starting point, four lugs equally spaced around the axis of the cam, one pair of diagonally opposite lugs being longer than the other pair, a push pawl capable of engaging the long lugs only, a pull pawl operatively engaging the short lugs only, actuator means to move the pawls simultaneously and move the push pawl in one direction sufficiently to give the cam a one-quarter turn if engaged with one of the long lugs, then move the pull pawl in the opposite direction sufficiently to give the cam a second one-quarter turn by engagement with one of the short lugs, then move the push pawl again in said one direction to give the cam a third one-quarter turn by engagement with the other long lug, and then move the pull pawl again in said opposite direction to give the cam a fourth one-quarter turn by engagement with the other short lug, thereby returning the cam to the starting point.

26. The cradle operating means set forth in claim 25 wherein if said one long lug is not engaged by the push pawl on the first motion thereof because the cam has already been given a one-quarter turn from said starting point, said push pawl will not engage a short lug and the cam will not be given a one-quarter turn, but the second, third and fourth one-quarter turns will nevertheless return the cam to its starting point.

27. The cradle operating means set forth in claim 25 wherein there are two cradles to be rocked in alternation and the cam has a dwell area and a working area and the cradles are operatively connected to the cam areas in such manner that one cradle is rocked and the other is at rest during the first two of said one-quarter turns and said one cradle is at rest and the other is rocked during the third and fourth of said one-quarter turns.

References Cited in the file of this patent

UNITED STATES PATENTS

| | | |
|---|---|---|
| 1,032,463 | Wyman | July 16, 1912 |
| 1,321,275 | Barrell | Nov. 11, 1919 |
| 1,766,830 | Nelson | June 24, 1930 |
| 2,892,470 | Corneliusson et al. | June 30, 1959 |
| 2,956,593 | Baumann | Oct. 18, 1960 |

FOREIGN PATENTS

| | | |
|---|---|---|
| 809,028 | France | Dec. 3, 1936 |
| 753,212 | Great Britain | July 18, 1956 |